United States Patent

Cennamo et al.

(10) Patent No.: US 12,055,658 B2
(45) Date of Patent: Aug. 6, 2024

(54) METHOD AND DEVICE FOR DETECTING OBJECTS

(71) Applicant: Aptiv Technologies AG, Schaffhausen (CH)

(72) Inventors: Alessandro Cennamo, Wuppertal (DE); Florian Kaestner, Bochum (DE)

(73) Assignee: Aptiv Technologies AG, Schaffhausen (CH)

( * ) Notice: Subject to any disclaimer, the term of this patent is extended or adjusted under 35 U.S.C. 154(b) by 423 days.

(21) Appl. No.: 17/479,290

(22) Filed: Sep. 20, 2021

(65) Prior Publication Data

US 2022/0120858 A1   Apr. 21, 2022

(30) Foreign Application Priority Data

Oct. 19, 2020   (EP) .................................. 20202567.2

(51) Int. Cl.
  *G01S 7/41*   (2006.01)
  *G01S 13/72*   (2006.01)
  *G06N 3/08*   (2023.01)

(52) U.S. Cl.
  CPC .............. *G01S 7/417* (2013.01); *G01S 13/72* (2013.01); *G06N 3/08* (2013.01)

(58) Field of Classification Search
  CPC ............ G01S 7/417; G01S 13/72; G06N 3/08
  See application file for complete search history.

(56) References Cited

U.S. PATENT DOCUMENTS

2020/0175286 A1\* 6/2020 Major .................... G06V 10/82
2021/0383167 A1\* 12/2021 Chakravarty .......... G06N 3/045

FOREIGN PATENT DOCUMENTS

WO   2019060125   3/2019

OTHER PUBLICATIONS

Qi, Charles R., et al. "Pointnet: Deep learning on point sets for 3D classification and segmentation supplementary material." (2017). (Year: 2017).\*

(Continued)

*Primary Examiner* — Peter M Bythrow
*Assistant Examiner* — Nazra Nur Waheed
(74) *Attorney, Agent, or Firm* — Harness, Dickey & Pierce, P.L.C.

(57) ABSTRACT

A method is provided for detecting objects by using a radar sensor and by using a device configured to establish a neural network. A plurality of raw radar data points is captured. At least one object class is defined comprising a predefined object type and a geometrical shape for enclosing an object. Via a first stage of the neural network, a semantic segmentation is performed for the data points regarding the object class and background, and for each data point, a rough approximation is estimated for a spatial condition of the geometrical shape. Based on this rough approximation and via a second stage of the neural network, a subset of the data points is selected based on the semantic segmentation, and for each data point of the subset, a refined approximation for the spatial condition of the geometrical shape and a confidence score for the refined approximation are estimated.

18 Claims, 6 Drawing Sheets

(56) References Cited

OTHER PUBLICATIONS

A. Danzer, T. Griebel, M. Bach and K. Dietmayer, "2D Car Detection in Radar Data with PointNets," 2019 IEEE Intelligent Transportation Systems Conference (ITSC), Auckland, New Zealand, 2019, pp. 61-66, doi: 10.1109/ITSC.2019.8917000. (Year: 2019).*
"Extended European Search Report", EP Application No. 20202567.2, Apr. 15, 2021, 16 pages.
Chen, et al., "3D Point Cloud Processing and Learning for Autonomous Driving", Mar. 1, 2020, 27 pages.
Danzer, et al., "2D Car Detection in Radar Data with PointNets", 2019 IEEE Intelligent Transportation Systems Conference (ITSC), Dec. 2, 2019, 7 pages.
Qi, et al., "Frustum PointNets for 3D Object Detection from RGB-D Data", Apr. 13, 2018, 10 pages.
Qi, et al., "PointNet: Deep Learning on Point Sets for 3D Classification and Segmentation", Conferene on Computer Vision and Pattern Recognition (CVPR) 2017, Jul. 2017, pp. 652-660.
Qi, et al., "PointNet++: Deep Hierarchical Feature Learning on Point Sets in a Metric Space", Jun. 7, 2017, 14 pages.
Rahman, "Recent Advances in 3D Object Detection in the Era of Deep Neural Networks: A Survey", Nov. 2019, pp. 2947-2962.
Schumann, et al., "Semantic Segmentation on Radar Point Clouds", Jul. 2018, pp. 2179-2186.

* cited by examiner

METHOD AND DEVICE FOR DETECTING OBJECTS

CROSS-REFERENCE TO RELATED APPLICATION

This application claims priority to European Patent Application Number 20202567.2, filed Oct. 19, 2020, the disclosure of which is hereby incorporated by reference in its entirety herein.

BACKGROUND

The present disclosure relates to a method and a device for detecting objects based on radar point clouds.

Modern vehicles usually include cameras, sensors and other devices for monitoring the environment of the vehicle. A reliable perception of the vehicle's environment is important e.g. for safety functions and driver assistance systems which are installed in the vehicle. In the field of autonomous driving, the reliable perception of the vehicle's environment is a crucial issue. For example, objects like other vehicles or pedestrians have to be detected and to be tracked for a proper performance of autonomous driving.

In many situations, noisy data from sensors, such as radar and/or LIDAR sensors and cameras, are available only for detecting and tracking objects. For example, data from a radar sensor may be provided as sparse data which form a so called point cloud including data points due to radar reflections belonging to certain objects like other vehicles or belonging to background reflections. Hence, it may be challenging to detect different objects correctly based on radar data only.

Therefore, machine learning approaches have been proposed for detecting objects based on radar point clouds. For example, Danzer et al.: "2D car detection in radar data with PointNets", 2019 IEEE Intelligent Transport Systems Conference, Auckland, New Zealand, New Zealand, Oct. 27-30, 2019, describe an approach which combines object classification with an estimation of a bounding box for objects based on a neural network architecture called PointNet (see also: Charles, R. Qi et al.: "PointNet: Deep Learning on Point Sets for 3D Classification and Segmentation". 2017 IEEE Conference on Computer Vision and Pattern Recognition (CVPR), Jul. 21-26, 2017, Honolulu, HI, USA). This basic neural network architecture shares fully connected layers between points and performs a so called "max-pooling" across point features in order to obtain a global signature for an entire point cloud. In the above mentioned approach, an object detector which is applied on a raw radar point cloud uses this basic neural network architecture several times in a hierarchical manner in order to perform a classification, i.e. to extract points belonging to a certain object only, and to estimate a bounding box which encloses the detected object completely and therefore defines its spatial condition.

This approach, however, requires a high computational effort since it is based on a so called "patch proposal" for each data point. The computational effort is increased by the use of "anchor boxes" for the bounding box estimation. In addition, although the existing approach for object detection may be extended to multiple classes of objects, e.g. different kinds of vehicles, pedestrians, etc., the extension to multiple object classes would further increase the computational effort since e.g. copies of the whole network would be required. During the classification, redundant operations may also be performed which could lead to an inconsistent determination of the bounding boxes for objects.

Accordingly, there is a need for a method and a device for detecting objects based on radar point clouds which allow for the detection of multiple object classes and which require a low computational effort.

SUMMARY

The present disclosure provides a computer implemented method, a device, a computer system and a non-transitory computer readable medium according to the independent claims. Embodiments are given in the subclaims, the description and the drawings.

In one aspect, the present disclosure is directed at a computer implemented method for detecting objects by using a radar sensor and by using a device configured to establish a neural network. According to the method, a raw radar point cloud comprising a plurality of data points is captured via the radar sensor, and at least one object class is defined, wherein each object class comprises a predefined object type and a geometrical shape configured to enclose an object of the predefined object type. Via a first stage of the neural network, a semantic segmentation regarding the at least one object class and regarding background is performed for the plurality of data points, and for each data point, a rough approximation is estimated for a spatial condition of the geometrical shape of the at least one object class. Based on the rough approximation for the spatial condition of the geometrical shape and via a second stage of the neural network, a subset of the plurality of data points is selected based on the semantic segmentation, and for each data point of the subset, a refined approximation is estimated for the spatial condition of the geometrical shape of the object class, together with a confidence score for the refined approximation for the spatial condition of the geometrical shape.

As input, the method uses the raw radar point cloud which may be based on a radar signal being reflected by objects in the environment of the radar sensor and acquired by this sensor.

If the radar sensor and the device for establishing the neural network are installed in a vehicle, the at least one object class may relate to vehicles and/or pedestrians, for example, and the respective object types may be "vehicle" and/or "pedestrian" is this case. Examples for a suitable geometrical shape of the at least one object class may be a bounding box, a sphere or a cylinder enclosing the object completely. For such geometrical shapes, the spatial condition may at least be defined by a center position of such a geometrical shape (e.g. for a sphere). In addition, the spatial condition may include further parameters for defining e.g. the dimensions and the orientation of the geometrical object, if required.

For performing the semantic segmentation, layers of the neural network reflect a probability for each data point of the point cloud for belonging to the at least one object class or for belonging to background. The semantic segmentation therefore determines whether the data point belongs to the at least one object class or not. Hence, via the semantic segmentation, the data points belonging to the at least one object class may be selected within the second stage of the neural network.

Furthermore, two or more object classes may be defined, i.e. different types of vehicles as object types and/or pedestrians as a further object type, if the method is to be implemented within a vehicle. Due to the network structure which comprises two stages of the neural network, the method may be extended to multiple classes of objects without increasing the required computational effort significantly. This is partly due to the selection of the subset of the original data points and due to the two steps of the approximation for the spatial condition of the geometrical shape.

Due to the two stages of the method, i.e. of the neural network, redundant operations may also be avoided which again reduces the computational effort. In addition, the two stages of the neural network may be trained separately which decreases the requirements for applying the method. Although the method is described as including one neural network having two stages, in practice the neural network may comprise two or more separate neural networks which are connected to each other.

Since the method results in the refined approximation for the spatial condition of the geometrical shape, an object to be detected is localized within this geometrical shape, e.g. a vehicle may be assumed to be within a corresponding bounding box for which the spatial condition is estimated by the method. That is, the object detection is performed by estimating e.g. the position and the orientation of the geometrical shape enclosing this object. In addition, the confidence score defines the reliability for the refined approximation which may include the final estimation for the location and orientation of the geometrical shape. The confidence score is important e.g. for further applications within a vehicle which rely on the output of the method for detecting objects, i.e. on the refined approximation for the spatial condition of the geometrical shape.

The method may comprise one or more of the following features:

The spatial condition may comprise a center of the geometrical shape, and estimating the rough and refined approximations of the spatial condition may comprise estimating a respective vector for each data point which shifts the respective data point toward the center of the geometrical shape. The spatial condition may further comprise dimensions of the geometrical shape, and estimating the refined approximation of the spatial condition may comprise estimating the dimensions of the geometrical shape. In addition, the spatial condition may further comprise an orientation of the geometrical shape, and estimating the refined approximation of the spatial condition may comprise estimating the orientation of the geometrical shape. Estimating the orientation of the geometrical shape may be split into a step of regressing angle information for the geometrical shape and a step of classifying the angle information.

The first stage of the neural network may comprise a respective output path for the semantic segmentation and for at least one parameter of the spatial condition, and the second stage of the neural network may also comprise a respective output path for the confidence score and for a refinement of the at least one parameter of the spatial condition. Each output path of the neural network may be trained based on a separate objective function.

Performing the semantic segmentation may be trained by defining a ground truth of the geometrical shape and by determining whether a respective data point is located within the ground truth of the geometrical shape. The first stage of the neural network may be deactivated while the second stage of the neural network is trained.

The geometrical shape of the at least one object class may comprise a bounding box, and estimating the refined approximation of the spatial condition may comprise estimating dimensions and an orientation of the bounding box. Furthermore, at least two different object classes may be defined, and the at least two different object classes may comprise different object types and different geometrical shapes.

Estimating the refined approximation for the spatial condition of the geometrical shape may be performed by a farthest point sampling on the selected subset of the plurality of data points only. Estimating the refined approximation for the spatial condition of the geometrical shape may comprise grouping the data points of the selected subset for training the second stage of the neural network regarding local structures.

According to an embodiment, the spatial condition may comprise a center of the geometrical shape, and estimating the rough and refined approximations of the spatial condition may comprise estimating a respective vector for each data point which shifts the respective data point toward the center of the geometrical shape. The shifting vector may also be regarded as offset vector for the respective data point. The final estimation for the center of the geometrical shape may be determined by calculating an average over all refined approximations for the center of the geometrical shape. Since the localization of the center of the geometrical shape may be performed in two steps by the rough and refined approximation and since background points are dropped before the refined approximation, a reduced computational effort may be required for estimating the center of the geometrical shape.

In addition, the spatial condition may further comprise dimensions of the geometrical shape, and estimating the refined approximation of the spatial condition may comprise estimating the dimensions of the geometrical shape. The dimensions of the geometrical shape may comprise a length, a width and a height e.g. of a bounding box for the object, a radius of a sphere enclosing the object or a radius and a height of a cylinder for enclosing the object. Alternately or additionally, the spatial condition may further comprise an orientation of the geometrical shape, and estimating the refined approximation of the spatial condition may comprise estimating the orientation of the geometrical shape. The orientation of the geometrical shape may include yaw, roll and pitch angles e.g. of a bounding box. If the radar sensor provides two-dimensional data only, the orientation of the geometrical shape may include a yaw angle only e.g. for a basic area of a bounding box. If the spatial condition of the geometrical shape may be defined by its center, its dimensions and its orientation, the method provides a straightforward manner for localizing the geometrical shape and for detecting the corresponding object.

In addition, estimating the orientation of the geometrical shape may be split into a step of regressing angle information for the geometrical shape and a step of classifying the angle information. Regressing an angle may be difficult for the neural network due to the periodicity of the angle with respect to $\pi$ or $2\pi$. Therefore, the reliability of the regression regarding the orientation of the geometrical shape may be improved by splitting up this task into a regression and a classification step. For example, the neural network may regress the absolute value of the sine and the cosine of a final yaw angle of a bounding box. For the classification, the neural network may determine the sign (i.e. $\pm 1$) of the sine and cosine of the final yaw angle.

According to a further embodiment, the first stage of the neural network may comprise a respective output path for the semantic segmentation and for at least one parameter of the spatial condition, and the second stage of the neural network may comprise a respective output path for the confidence score and for a refinement of the at least one parameter of the spatial condition. Each output path of the neural network may be trained based on a separate objective function. Due to the separate objective functions, the total effort for training the neural network may be reduced. In addition, the reliability of the final estimation or final prediction of the neural network may be improved by adapting the respective objective function to a task leading to the respective output path.

Performing the semantic segmentation may be trained by defining a ground truth of the geometrical shape and by determining whether a respective data point is located within the ground truth of the geometrical shape. Hence, the semantic segmentation may be performed based on a straightforward prerequisite, i.e. the localization of known objects defining the ground truth of the geometrical shape. Furthermore, a transition region may be defined close to e.g. the surfaces of a bounding box defining the ground truth, i.e. inside the bounding box but close to its boundaries. This may avoid estimations for the center of the geometrical shape which are far away from the real center defined by the ground truth of the bounding box.

According to a further embodiment, the first stage of the neural network may be deactivated while the second stage of the neural network is trained. In other words, the two stages of the neural network may be trained independently of each other. Therefore, the effort for training the neural network may again be reduced.

Furthermore, the geometrical shape of the at least one object class may comprise a bounding box, and estimating the refined approximation of the spatial condition may comprise estimating dimensions and an orientation of the bounding box. The bounding box may be a straightforward representation for the geometrical shape e.g. for detecting vehicles as further objects.

According to a further embodiment, two different object classes may be defined, and the at least two different object classes may comprise different object types and different geometrical shapes. Due to the two-stage architecture of the neural network, the method may be extended in a straightforward manner to at least two different object classes without increasing the computational effort significantly. For detecting objects within the environment of a vehicle, the two different geometrical shapes may be a bounding box for representing a vehicle and a cylinder for representing a pedestrian.

Estimating the refined approximation for the spatial condition of the geometrical shape may be performed by farthest point sampling on the selected subset of the plurality of data points only. Alternately or additionally, estimating the refined approximation may comprise grouping the data points of the selected subset for training the second stage of the neural network regarding local structures. Since these steps are based on the selected subset of the data points only, the effort for the refined approximation may again be reduced.

In another aspect, the present disclosure is directed at a device for detecting objects. The device comprises a radar sensor acquiring a radar signal being reflected by objects in the environment of the radar sensor and providing a raw radar point cloud based on the radar signal, wherein the raw radar point cloud comprises a plurality of data points. The device further comprises a module configured to establish a neural network comprising a first stage and a second stage and to define at least one object class, each object class comprising a predefined object type and a geometrical shape configured to enclose an object of the predefined object type. The first stage of the neural network is configured to perform a semantic segmentation regarding the at least one object class and regarding background for the plurality of data points, and to estimate, for each data point, a rough approximation for a spatial condition of the geometrical shape of each object class. Based on the rough approximation for the spatial condition of the geometrical shape, the second stage of the neural network is configured to select a subset of the plurality of data points based on the semantic segmentation, and for each data point of the subset, to estimate a refined approximation for the spatial condition of the geometrical shape of the object class and to estimate a confidence score for the refined approximation for the spatial condition of the geometrical shape.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

In summary, the device according to the disclosure includes the radar sensor and the module for performing the steps as described above for the corresponding method. Therefore, the benefits, the advantages and the disclosure as described above for the method are also valid for the device according to the disclosure.

In another aspect, the present disclosure is directed at a computer system, said computer system being configured to carry out several or all steps of the computer implemented method described herein.

The computer system may comprise a processing unit, at least one memory unit and at least one non-transitory data storage. The non-transitory data storage and/or the memory unit may comprise a computer program for instructing the computer to perform several or all steps or aspects of the computer implemented method described herein.

In another aspect, the present disclosure is directed at a non-transitory computer readable medium comprising instructions for carrying out several or all steps or aspects of the computer implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM); a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all steps or aspects of the computer implemented method described herein.

BRIEF DESCRIPTION OF THE DRAWINGS

Exemplary embodiments and functions of the present disclosure are described herein in conjunction with the following drawings, showing schematically.

DETAILED DESCRIPTION

Figure 1:
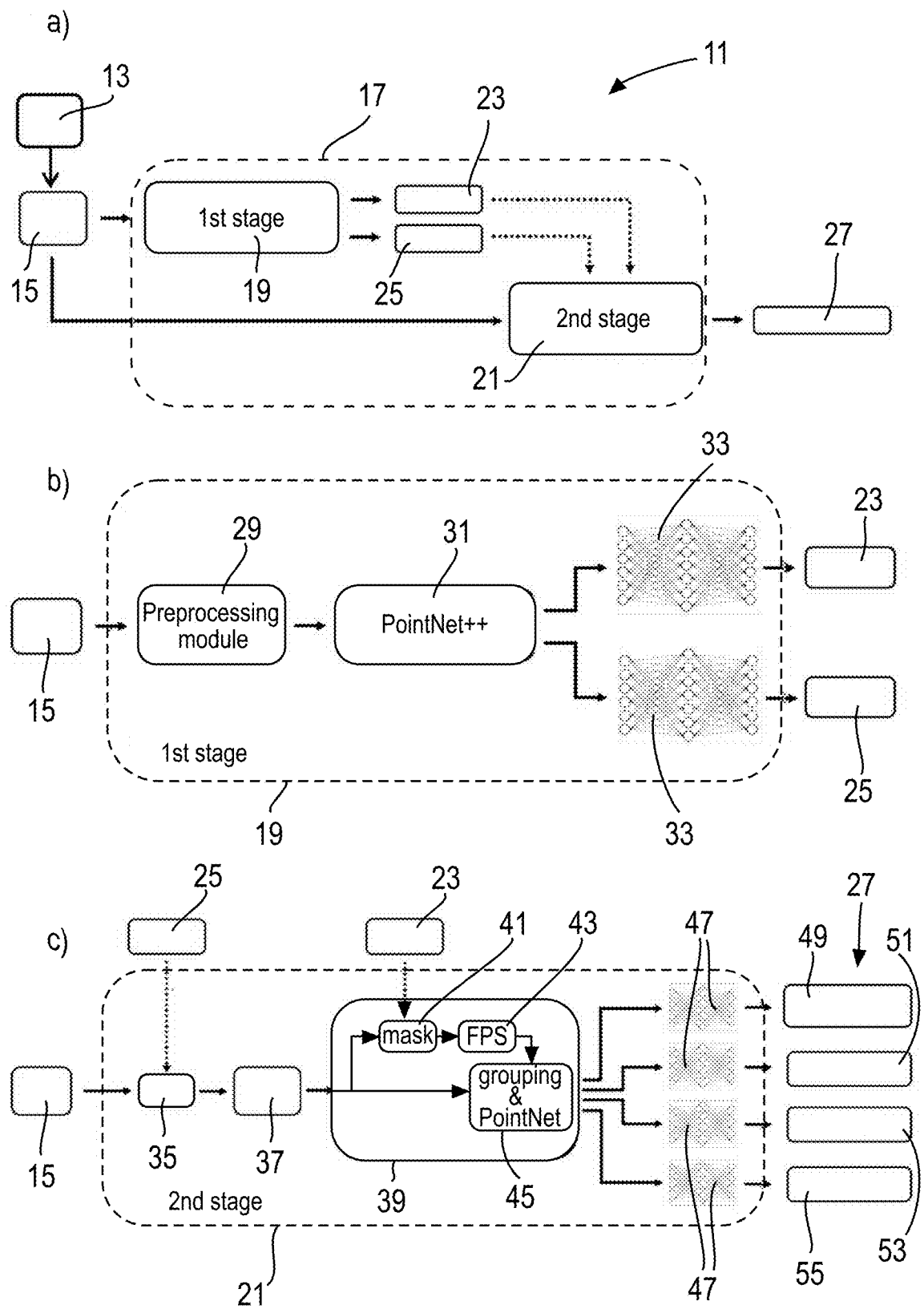
FIG. 1 depicts a schematic diagram of a device for detecting objects by performing a method according to the disclosure.

FIG. 1 depicts a schematic diagram of a device 11 for detecting objects. The device 11 includes a radar sensor 13 which provides a raw radar point cloud comprising a plurality of data points 15 and a module 17 configured to establish a neural network including a first stage 19 and a second stage 21. The plurality of data points 15 from the raw radar point cloud are used as input for the module 17, i.e. for the first and the second stages 19, 21 of the neural network.

The radar sensor 13 acquires a radar signal which is reflected by objects in the environment of the radar sensor 13. For example, the device 11 is installed in a host vehicle 20 (see FIG. 4). In this case, the radar signal is reflected by other vehicles which are located within bounding boxes 61 and by further objects outside these bounding boxes 61 (see the upper diagram of FIG. 4). Hence, the data point cloud is represented by a plurality of two-dimensional data points for which the x- and y-coordinates are known with respect to a coordinate system of the host vehicle 20, i.e. with respect to the radar sensor 13 which is installed in the host vehicle 20.

FIG. 1a) provides a high-level overview of the device 11, whereas FIG. 1b) shows the inner structure of the first stage 19 and FIG. 1c) shows the inner structure of the second stage 21 of the neural network being established by the module 17. The first stage 19 of the neural network receives the plurality of data points 15 as input and outputs a semantic segmentation 23 for the plurality of data points 15 and an offset 25 for each of the data points 15. The second stage 21 receives the plurality of data points 15 from the radar sensor 13 as well as the semantic segmentation 23 and the offset 25 from the first stage 19 as input and outputs parameters 27 of bounding boxes 61 (see FIGS. 2 to 6). The parameters 27 define a spatial condition of the bounding boxes 61 and therefore the spatial condition of objects to be detected which are enclosed by these bounding boxes 61.

The method is described in the following as including one neural network having two stages. However, the neural network may also be regarded as including two or more separate neural networks which are connected to each other.

FIG. 1b) depicts the inner structure of the first stage 19 of the neural network being established by the module 17. The first stage 19 includes a preprocessing module 29 which encodes radar information of each data point of the plurality of data points 15 (e.g. the x- and y-coordinates, Doppler velocity and radar cross section) in order to provide deeper feature vectors. The encoding puts the plurality of data points 15 which are used as input of the first stage 19 into a better representation for the tasks of the first stage 19, i.e. performing the semantic segmentation 23 and determining the offset 25.

The output of the preprocessing module 29 is received by a further neural network structure called "PointNet++" 31 which is described in detail in Charles, R. Qi et al.: "PointNet++: Deep Hierarchical Feature Learning on Point Sets in a Metric Space", arXiv:1706.02413v1 [cs.CV] 7 Jun. 2017.

This neural network structure 31 includes so called set-abstraction layers and fully connected layers which are shared by all data points 15, which is described below in detail in context of the second stage 21. The first stage 19 of the neural network further includes a first output path for performing semantic segmentation 23 and a second output path for determining offset vectors 25 for each of the plurality of data points 15.

For the semantic segmentation 23, object classes are defined, wherein each object class includes a predefined object type and a geometrical shape configured to enclose an object of the predefined object type. If the device 11 is installed in the host vehicle 20 (see FIG. 4), there are two object classes, wherein the first object class includes the object type "vehicle" for which a bounding box 61 (see FIG. 4) is used as geometrical shape, whereas the second object class includes the object type "pedestrian" for which a cylinder is used as geometrical shape. When performing the semantic segmentation 23, for each data point 15 a probability is established for belonging to one of the predefined object classes (i.e. vehicle or pedestrian) or for belonging to background. In detail, weights of the layers 33 of the neural network used for semantic segmentation 23 will reflect the probability for each data point 15 to belong to one of the object classes or to background, and the layers 33 will classify all data points 15 accordingly. The data points 15 which are not classified as background will be used as center proposals for bounding boxes within the second stage 21 of the neural network.

For learning the task of semantic segmentation 23, focal classification loss is used as objective function. Furthermore, ground truth bounding boxes are defined, and such points from the plurality of data points 15 are labelled as positive which are located inside the respective ground truth bounding box. In addition, a transition region may be defined for which points being located inside the ground truth bounding box but close to its boundaries are marked and not labelled as positive.

The data points 15 which are classified as belonging to one of the object classes and which are not classified as background will be used as proposals for a center of the bounding box in the second stage 21 of the neural network. If the transition region is used when learning the task of semantic segmentation, center proposals are avoided which are far away from the real center of the bounding box.

Figure 2:
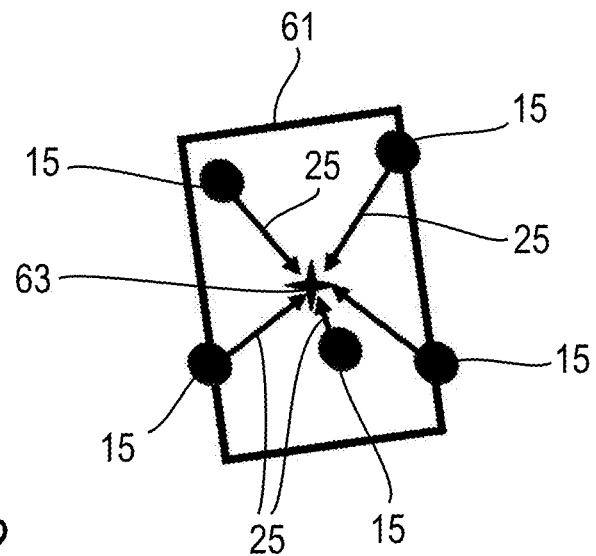
FIG. 2 is an illustration of offset vectors applied to data points.

In the second output path of the first stage 19, for each data point 15 a respective offset vector 25 is determined which shifts the respective data point 15 toward the center of the object or its bounding box. This is illustrated in FIG. 2 in which five data points 15 are shown together with a respective offset vector 25. In addition, a bounding box 61 is shown having a real center 63. Each data point 15 is shifted closer to the center 63 via the respective offset vector 25.

In detail, the x- and y-components of the offset vector are regressed by the neural network. The network predicts values in a range from −1 to +1 which are multiplied by a suitable scalar. This scalar is chosen to be large enough in order not to limit the output representation of the network, i.e. the offset vector 25. However, by choosing the suitable scalar it can be avoided that data points 15 are shifted toward centers of bounding boxes which belong to a further object. For learning the task of determining offset vectors 25, a smooth L1 regression loss is used as objective function.

Therefore, the two output paths resulting in the semantic segmentation 23 and in the offset vectors 25 are optimized independently by corresponding objective functions. However, the common part of the PointNet++ 31 of the neural network is optimized or trained by using the objective functions of both output paths.

The inner structure of the second stage 21 of the neural network is shown in FIG. 1*c*). The second stage 21 receives the data points 15 as input together with the semantic segmentation 23 and the offset vectors 25 which are output by the first stage 19 of the neural network. In a shifting step 35, the data points 15 are each shifted by the respective offset vector 25 in order to end up with shifted data points 37. The shifted data points 37 are the input for the further layers 39, 47 of the second stage 21 of the neural network.

Figure 5:
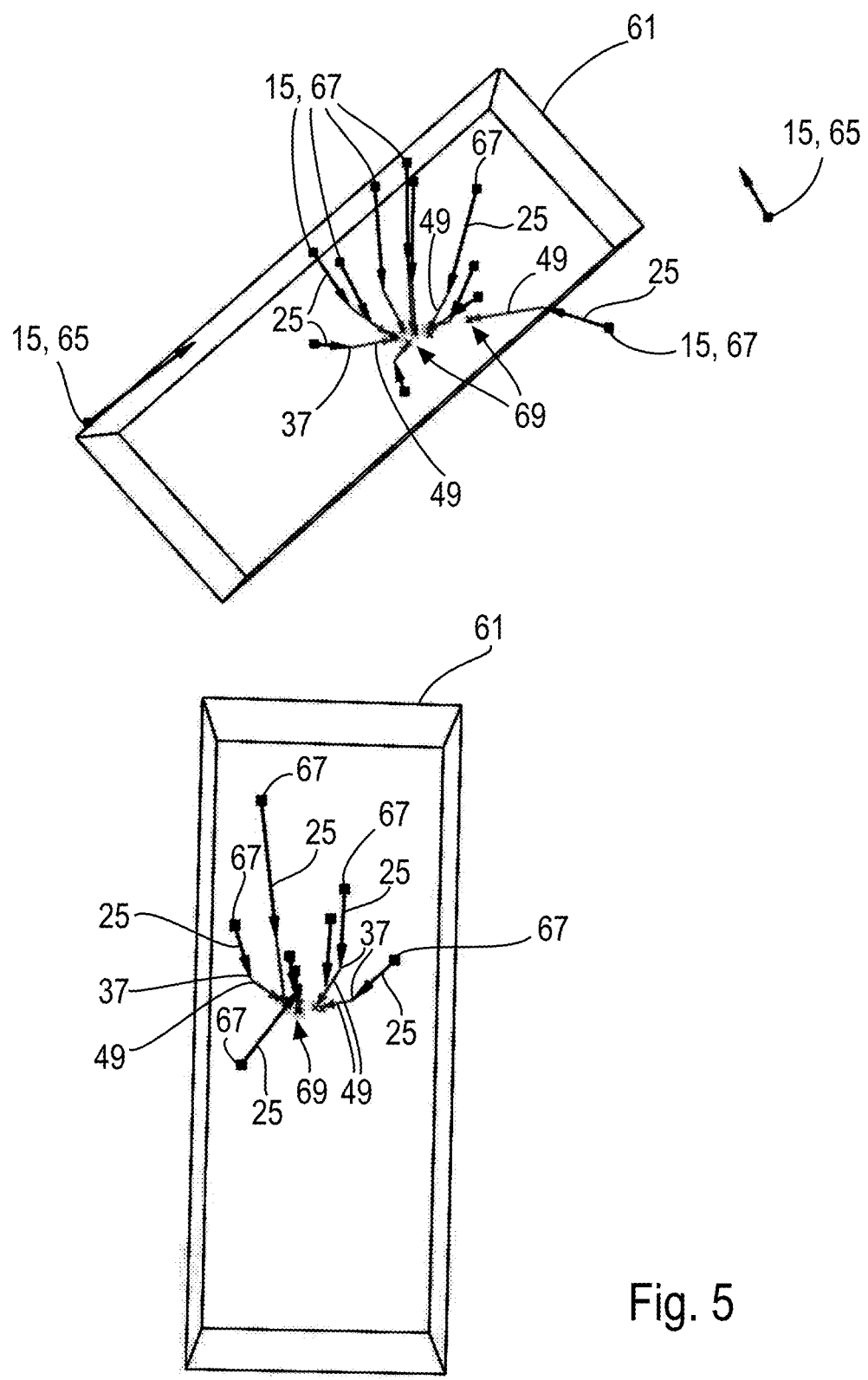
Figure 6:
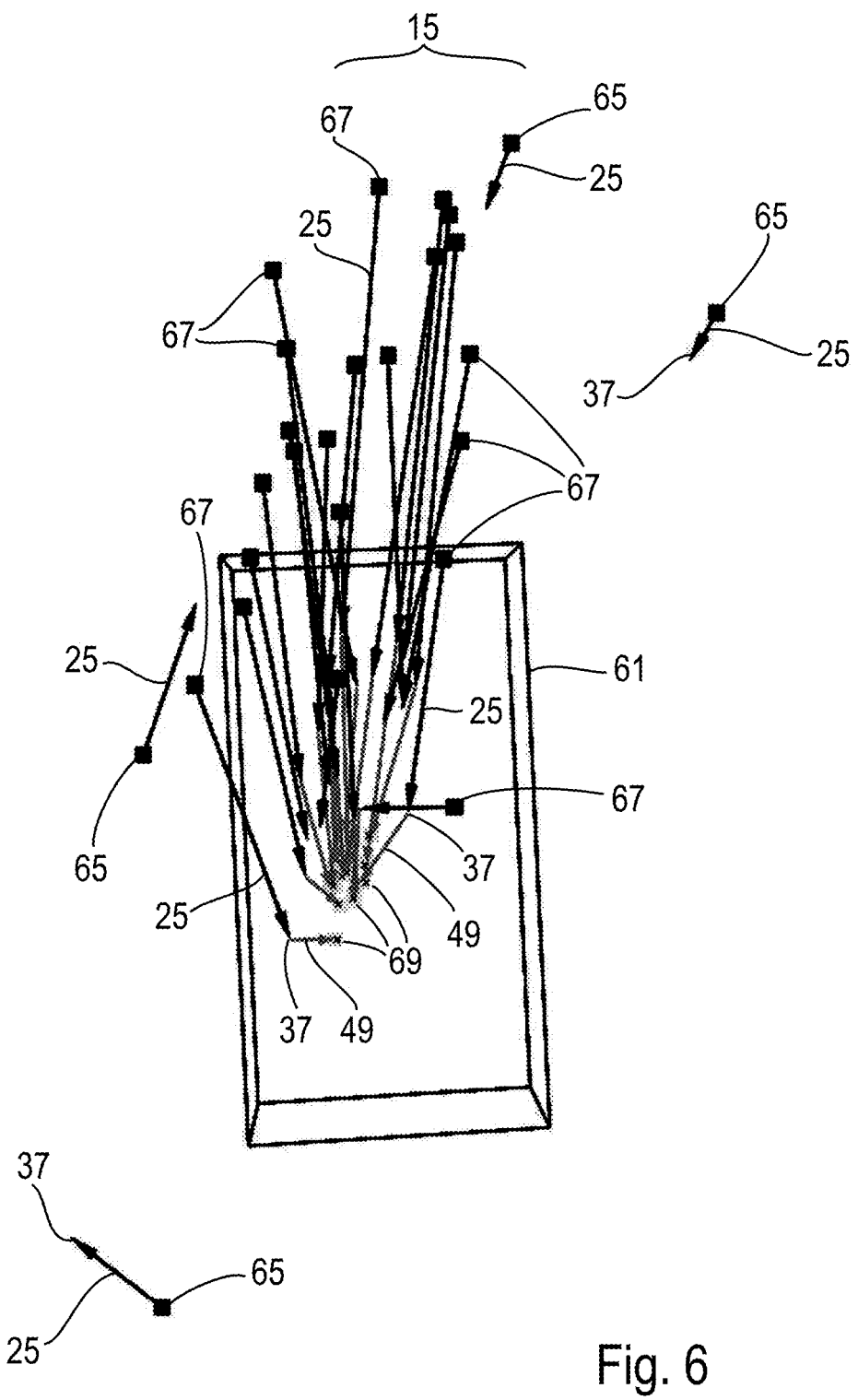

FIGS. 5 and 6 show examples for the shifting step 35 being applied on the data points 15. For each of the data points 15 which form the raw radar point cloud being provided by the radar sensor 13, a respective offset vector 25 moves the data points 15 in the direction of an assumed center of the corresponding bounding box 61. That is, the shifted data points 37 are generated as shifted input for the layers of the second stage 21 based on the original data points 15 and based on the offset vectors 25 as result of the first stage 19 of the neural network. Hence, the shifted data points 37 may be regarded as a first approximation for estimating the true center of the bounding box 61. The first approximation represented by the shifted data points 37 will be refined by the second stage 21.

To perform this refinement, the second stage 21 includes a set-abstraction layer (SA layer) 39 which is a fundamental element of the architecture of PointNet++. However, this set-abstraction layer is enhanced by a masking or selecting step 41 which is applied to the shifted data points 37. In order to perform this masking or selecting 41, the results of the semantic segmentation 23 are used which are output by the first stage 19 of the neural network.

Figure 4:
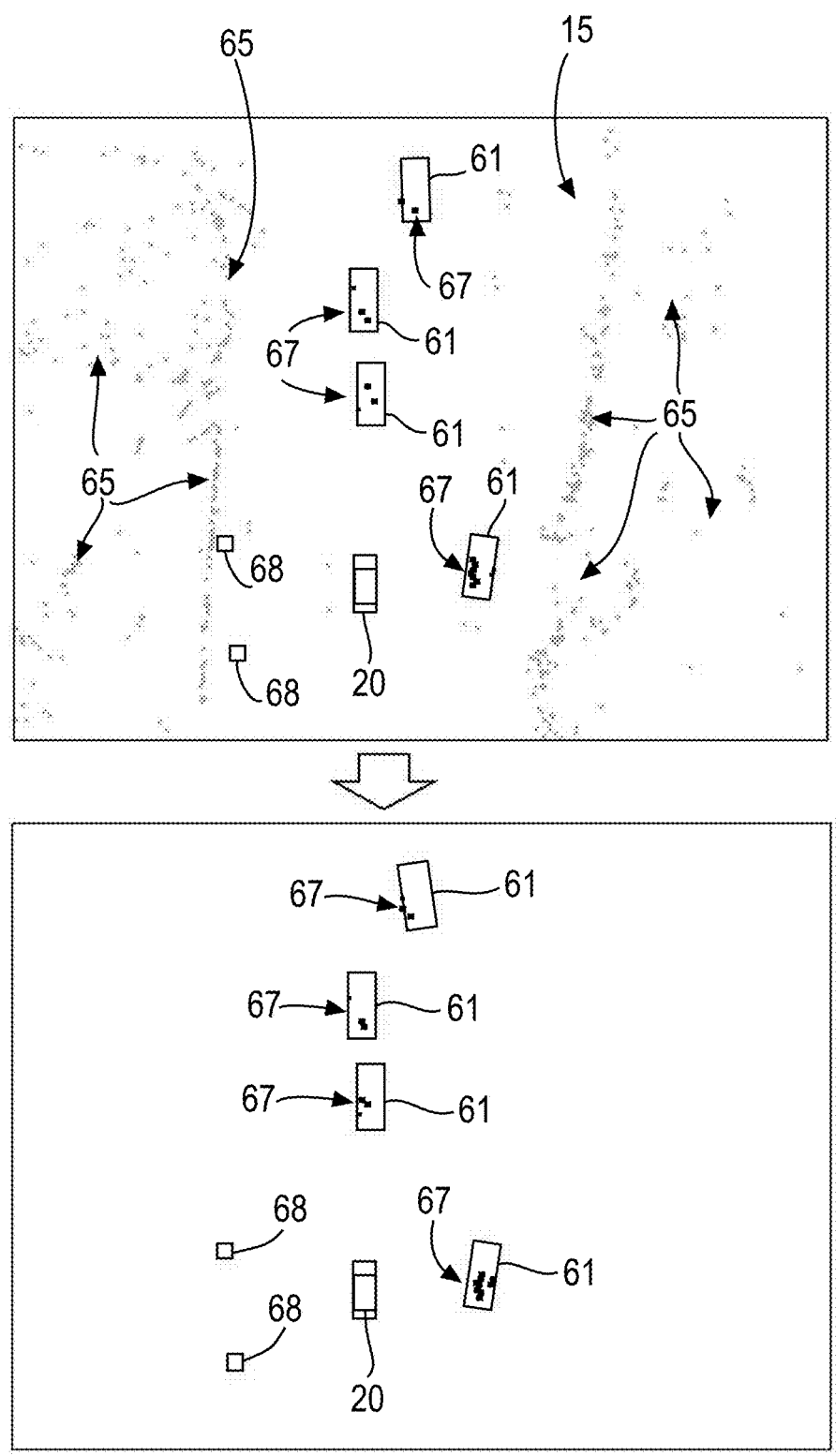
FIG. 4 depicts a masking step applied to data points in the second stage as shown in FIG. 1, FIGS. 5 and 6 depict examples for determining a spatial condition of a bounding box based on raw data points by the device as shown in FIG. 1.

FIG. 4 shows the effect of the masking or selecting step 41. A raw radar point cloud comprising data points 15 are depicted before (upper part) and after (lower part) the masking or selecting step 41. It is noted that the entire point cloud is shown in the upper part of FIG. 4 before the shifting step 35 is applied (see also FIGS. 5 and 6). Before the masking 41, the point cloud includes all data points, i.e. data points 65 being classified as background as well as data points 67 classified as vehicle and data points 68 classified as pedestrian. After the masking or selecting step 41, data points 67, 68 are considered only which are classified as belonging either to a vehicle or to a pedestrian.

After performing the masking or selecting step 41 with the shifted data points 37, a so called farthest point sampling (FPS) 43 is applied to the remaining data points. Farthest point sampling refers to choose a subset of m points from n points (n>m) such that each point from this subset is the most distant point with respect to all proceeding points within the subset. Due to the farthest point sampling 43, at least one data point is sampled for each object to be detected.

Figure 3:
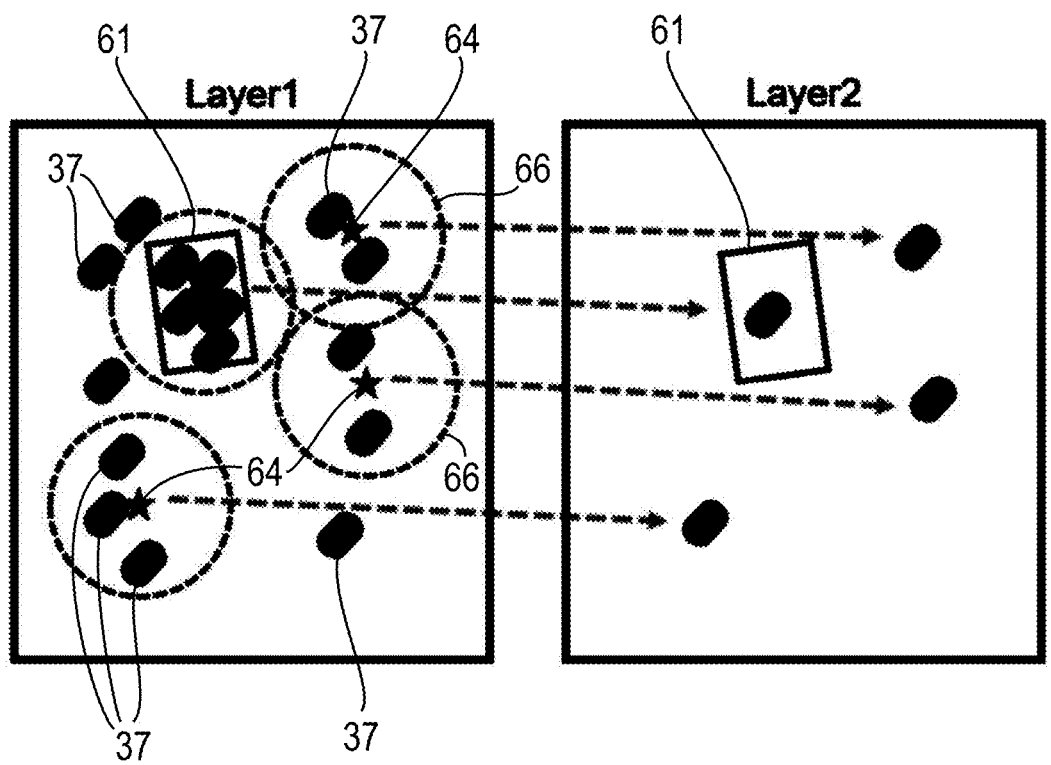
FIG. 3 depicts an inner mechanism of a part of the device from FIG. 1.

After this sampling step 43, a grouping or clustering step 45 is performed based on the sampled data points from step 43 for the shifted data points 37. In detail, the neural network clusters data points which are located within a certain radius with respect to the sampled data points. FIG. 3 depicts an example for the grouping step 45 on the left side (layer 1). The shifted data points 37 are grouped or clustered with a respective circle 66 having a certain predefined radius around the sampled data points 64. The output of the grouping step 45 and of the entire set-abstraction layer 39 is a list of sampled points with deep feature vectors which contain object information instead of abstract local encoding as used in comparable methods of the related art. Finally, the output of the set-abstraction layer 39 is processed by further shared fully connected layers 47 of the neural network in order to regress the parameters 27 of the bounding boxes 61, i.e. in order to estimate the spatial condition of these bounding boxes. This is illustrated on the left side of FIG. 3 where the result of "learning" from the local structures via a further layer 2 is shown, i.e. from the surrounding data points for each sampled data point.

The second stage 21 of the neural network includes four output paths, each corresponding to one of the parameters 27 of the bounding boxes. In detail, the four output paths correspond to refined offset vectors 49, bounding box dimensions (BB dimensions) 51, bounding box yaw angle (BB yaw) 53 and a bounding box confidence score (BB score) 55.

The refined offset vectors 49 are determined in a very similar manner as the offset vectors 25 in the first stage 19. That is, refined vectors 49 are determined which move the shifted and selected data points closer to the true center of the bounding box 61. However, the scalar being used is half of the scalar of the first stage. To learn the task of determining the refined offset vectors 49, a smooth L1 regression loss is used again as objective function.

The bounding box dimensions 51 refer to the width and the length of the bounding box under consideration. The fully connected layers 47 of the network predict a value x in a range from −1 to +1 in order to compute e.g. the width w of the bounding box as $$w = s \cdot e^x \quad (1)$$

wherein x is the prediction of the network and s is a further scalar. When considering vehicles as an example, the scalar s may be set to 6 m, and in this case the neural network is able to predict a width (and in the same manner a length) of the vehicle (as an object to be detected) in a range from 2.2 m to 16 m.

For learning the task of determining the bounding box dimensions 51, an objective function is defined as $$loss = 1 - \min\left(\frac{w_{pred}}{w_{gt}}, \frac{w_{gt}}{w_{pred}}\right) \quad (2)$$

wherein $w_{pred}$ is a predicted width of the bounding box and $w_{gt}$ is a width of a ground truth bounding box. By such an objective function, an overestimation of the bounding box dimensions 51 is avoided.

The third output path of the second stage 21 refers to the orientation of the bounding boxes which is the bounding box yaw angle 53 in case of two-dimensional raw radar input data. Since the regression of an angle is a difficult task for a neural network due to the periodicity with respect to $\pi$ or $2\pi$, the task of determining the orientation of the bounding boxes is split into a regression step and a classification step. For the regression, the neural network regresses the absolute value of the sine and the cosine of the yaw angle to be determined. The classification determines the sign, i.e. ±1, of the sine and the cosine of this yaw angle. For learning the task of determining the bounding box yaw angle 53, a mean square error loss (MSE loss) is used as objective function for learning the regression task, whereas a binary cross-entropy loss is used as objective function for the classification task.

Since loss objectives have to be merged for two tasks, the classification is dynamically weighted, wherein dynamic weights are computed as:

$$weight = 2 \cdot [1 - \max(\sin^2\theta_{gt}, \cos^2\theta_{gt})] \quad (3)$$

wherein $\theta_{gt}$ is the ground truth yaw angle. The function for the weight has a minimum of 0 at $m \cdot \pi/2$ and a maximum of 1 at $(2m+1) \cdot \pi/4$ for all m being a positive or negative whole number or zero. By this weighting, the impact of the classification on the whole task of determining the orientation is lower when the ground truth yaw angle is in the proximity of classification boundaries. By this means, the neural network can perform a correct regression of the sine and cosine even for an erroneous sign estimation (due to the classification) which will not lead to significant errors.

The fourth output path of the second stage 21 refers to the bounding box confidence score 55. It is important to provide the confidence score for the network prediction if non-max suppression is applied in a post-processing step (which is not shown in the figures). Such a post-processing may be necessary if several overlapping bounding box estimations have to be merged into a single bounding box estimation.

In order to estimate the bounding box confidence score 55, ground truth bounding boxes need to be defined, and for all bounding boxes for which the bounding box parameters 27 are determined, a so called Intersection over Union score (IoU score) is calculated. The Intersection over Union score compares a predicted bounding box with a ground truth bounding box and is defined as the ratio of the intersection or overlap of the predicted and ground truth bounding boxes with respect to their union. A detection of a bounding box is regarded as positive if the IoU score is above a given threshold, e.g. 0.35. In order to avoid confusion in the network, bounding boxes having an IoU score slightly below this threshold (e.g. in a range from 0.2 to 0.35) are masked out.

For estimating the bounding box confidence score 55 for bounding boxes which are not aligned, an empirical approximation is used. First, the center of a predicted bounding box and the center of a ground truth bounding box are determined. Around these centers, bounding boxes having an estimated size or estimated dimensions are formed, and both bounding boxes are rotated by the ground truth yaw angle. Then the intersection for these aligned boxes is computed. The value of the intersection is weighted by the absolute cosine value of the angle error and rescaled to fit in a range from 0.5 to 1. The final bounding box confidence score or IoU score is then computed by dividing the approximated intersection by the union area, i.e. the sum of the areas of the two boxes, i.e. the ground truth bounding box and the predicted bounding box, minus the approximated intersection.

For learning the task of determining the bounding box confidence score, the focal segmentation loss is used again as objective function. Furthermore, the four output paths of the second stage 21 are trained independently with respect to their objective functions, and the common part of the second stage 21, i.e. the set-abstraction layer 39, is trained by using all objective functions. Moreover, the first stage 19 is deactivated or "frozen" while the second stage 21 is trained.

In FIGS. 5 and 6, the effect of the second stage 21 is shown by the refined offset vectors 49 and the bounding boxes 61. In detail, the data points 15 which are shifted by the shifting step 35 to end up at the shifted data points 37 are moved closer to the center of the bounding box 61 by the refined offset vectors 49 which are represented by the inner or second arrows in FIGS. 5 and 6. After applying the refined offset vectors 49, final center proposals 69 are found at the end of the "second" arrows 49. For the bounding box 61, the second stage 21 also determines the bounding box dimensions 51, i.e. its length and width, and the bounding box yaw angle 53 in order to define the orientation of the bounding box. Hence, the spatial condition of the bounding box 61 is estimated by estimating its center, its dimensions and its yaw angle.

Some of the data points 15 are classified as background points 65 in the first stage 19 of the neural network. For these background points 65, no refined offset vector 49 is estimated by the second stage 21 of the neural network due to the masking step 41 based on the semantic segmentation 23. In other words, the background points 65 are sorted out in the second stage 21.

For testing the device 11 and the method according to the disclosure, two object classes were defined. The first object class included "vehicle" as object type and the bounding boxes as described above for the geometrical shape to enclose the object. The second object class included "pedestrian" as object type and a cylinder as geometrical shape. For the first object class (vehicle) the bounding box parameters 27 were estimated via the second stage 21 of the neural network. For the second object class (pedestrian) refined offset vectors 49 and the bounding box confidence score 55 were estimated only. For the cylinder as geometrical shape, a fixed diameter of 0.5 meters was assumed, and no yaw angle needed to be determined for the two-dimensional data.

Furthermore, the network was tested by two different setup configurations. For the first setup configuration, data points 15 from a single radar frame (1 frame) were used as input to estimate the bounding box parameters 27. For the second configuration, data points 15 from four radar frames (4 frames) were used which were compensated to account for the ego-movement of the host vehicle 20. For the 4 frames setup, four measurements of a scene, i.e. of the environment of the host vehicle 20, were fused, and additional layers were provided for the neural network.

Figure 7:
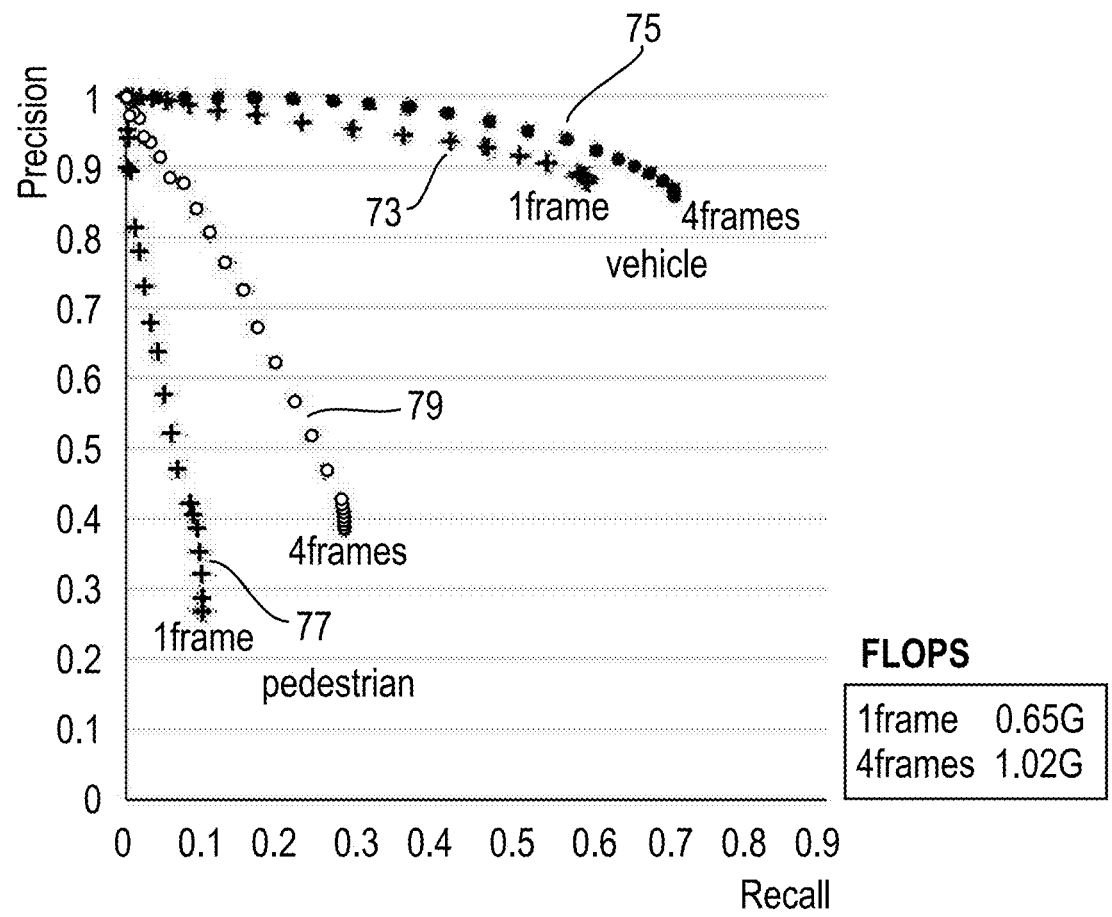
FIG. 7 depicts a diagram for precision and recall as determined for the detection of two different object types by the device according to the disclosure.

In FIG. 7, the results of the testing are shown, i.e. the precision on the y-axis over the recall on the x-axis. Precision and recall are typical figures of merit for neural networks. Precision describes the portion of positive identifications which are actually correct, whereas recall describes the portion of actual positive identifications which are identified correctly. In addition, recall is a measure for the stability of the neural network. An ideal neural network would have a precision and a recall in the range of 1, i.e. a data point in the upper right corner of FIG. 7. In addition, the 4 frames setup included a higher number of floating point operations (FLOPS) than the 1 frame set up, which is indicated in the lower right corner of FIG. 7.

The crosses labelled by 73 are the results for the 1 frame setup for the vehicle object class, whereas the dots labelled 75 are the results for the 4 frames setup for the same object class, i.e. "vehicle". Furthermore, the crosses labelled 77 are the results for the 1 frame setup and for the pedestrian object class, whereas the dots labelled 79 represent the results for this pedestrian object class based on the 4 frames setup. The results show that the neural network is able to detect both vehicles and pedestrians in a suitable manner for both setups.

In summary, the 4 frames setup results in a better performance than the 1 frame setup. However, the results as shown in FIG. 7 indicate that the device 11 and the method according to the disclosure allow for a reasonable trade-off between performance and cost.

What is claimed is:
1. A method comprising:
   capturing, via a radar sensor, a raw radar point cloud comprising a plurality of data points;

defining at least one object class comprising a predefined object type and a geometrical shape to enclose an object of the predefined object type;
via a first stage of a neural network:
performing, for the plurality of data points, a semantic segmentation regarding the object class and background; and
estimating, for each data point of the plurality of data points, a rough first approximation for a spatial condition of the geometrical shape; and
via a second stage of the neural network:
selecting, based on the first approximation for the spatial condition of the geometrical shape, a subset of the plurality of data points based on the semantic segmentation; and
estimating, for each data point of the subset of the plurality of data points, a second approximation that refines the first approximation for the spatial condition of the geometrical shape and a confidence score for the second approximation for the spatial condition of the geometrical shape;
wherein:
the spatial condition of the geometrical shape comprises a center of the geometrical shape;
estimating the second approximation for the spatial condition of the geometrical shape comprises estimating, for each data point of the subset of the plurality of data points, a respective shifting vector that shifts the respective data point of the subset of the plurality of data points toward the center of the geometrical shape for providing center proposals for the geometrical shape; and
the method further comprises determining a final estimation for the center of the geometrical shape by calculating an average over the center proposals of the geometrical shape.

2. The method of claim 1, wherein:
the spatial condition of the geometrical shape further comprises dimensions of the geometrical shape; and
estimating the second approximation for the spatial condition of the geometrical shape comprises estimating the dimensions of the geometrical shape.

3. The method of claim 2, wherein:
the spatial condition of the geometrical shape further comprises an orientation of the geometrical shape; and
estimating the second approximation for the spatial condition of the geometrical shape comprises estimating the orientation of the geometrical shape.

4. The method of claim 3, wherein estimating the orientation of the geometrical shape is split into a step of regressing angle information for the geometrical shape and a step of classifying the angle information.

5. The method of claim 1, wherein:
the first stage of the neural network comprises a respective output path for the semantic segmentation and for at least one parameter of the spatial condition of the geometric shape;
the second stage of the neural network comprises a respective output path for the confidence score and for a refinement of the at least one parameter of the spatial condition of the geometric shape; and
each output path of the neural network is trained based on a separate objective function.

6. The method of claim 1, wherein
performing the semantic segmentation is trained by defining a ground truth of the geometrical shape and determining whether a respective data point of the plurality of data points is located within the ground truth of the geometrical shape.

7. The method of claim 1, wherein the first stage of the neural network is deactivated while the second stage of the neural network is trained.

8. The method of claim 1, wherein:
the geometrical shape of the object class comprises a bounding box; and
estimating the second approximation for the spatial condition comprises estimating dimensions and an orientation of the bounding box.

9. The method of claim 1, wherein:
at least two different object classes are defined; and
the at least two different object classes comprise different object types and different geometrical shapes.

10. The method of claim 1, wherein
estimating the second approximation for the spatial condition of the geometrical shape is performed by a farthest point sampling on only a selected subset of the plurality of data points.

11. The method of claim 10, wherein
estimating the second approximation for the spatial condition of the geometrical shape comprises grouping the data points of the selected subset for training the second stage of the neural network regarding local structures.

12. A system comprising:
a radar sensor configured to:
acquire a radar signal being reflected by objects in an environment of the radar sensor; and
provide a raw radar point cloud based on the radar signal, the raw radar point cloud including a plurality of data points;
a neural network including a first stage and a second stage and configured to define at least one object class including a predefined object type and a geometrical shape to enclose an object of the predefined object type;
wherein:
the first stage of the neural network is configured to:
perform a semantic segmentation regarding the object class and background for the plurality of data points; and
estimate, for each data point of the plurality of data points, a first approximation for a spatial condition of the geometrical shape;
the second stage of the neural network is configured to:
select, based on the first approximation for the spatial condition of the geometrical shape, a subset of the plurality of data points based on the semantic segmentation; and
estimate, for each data point of the subset of the plurality of data points, a second approximation that refines the first approximation for the spatial condition of the geometrical shape and a confidence score for the second approximation for the spatial condition of the geometrical shape;
the spatial condition of the geometrical shape comprises a center of the geometrical shape; and
in estimating the second approximation for the spatial condition of the geometrical shape, the neural network is configured to estimate, for each data point of the subset of the plurality of data points, a respective shifting vector that shifts the respective data point of the subset toward the center of the geometrical shape for providing center proposals for the geometrical shape, and to determine a final estimation for the center of the geometrical shape by calculating an average over the center proposals of the geometrical shape.

13. The system of claim 12, wherein:
the spatial condition of the geometrical shape further comprises dimensions of the geometrical shape; and
in estimating the second approximation for the spatial condition of the geometrical shape, the neural network is configured to estimate the dimensions of the geometrical shape.

14. The system of claim 12, wherein:
the spatial condition of the geometrical shape further comprises an orientation of the geometrical shape; and
in estimating the second approximation for the spatial condition of the geometrical shape, the neural network is configured to estimate the orientation of the geometrical shape.

15. The system of claim 14, wherein:
in estimating the orientation of the geometrical shape, the neural network is configured to regress angle information for the geometrical shape and classify the angle information.

16. The system of claim 12, wherein:
the first stage of the neural network comprises a respective output path for the semantic segmentation and for at least one parameter of the spatial condition of the geometrical shape;
the second stage of the neural network comprises a respective output path for the confidence score and for a refinement of the at least one parameter of the spatial condition of the geometrical shape; and
each output path of the neural network is trained based on a separate objective function.

17. The system of claim 12, wherein:
performing the semantic segmentation is trained by defining a ground truth of the geometrical shape and determining whether a respective data point of the plurality of data points is located within the ground truth of the geometrical shape.

18. A non-transitory computer readable medium comprising instructions that, when executed, cause one or more processors of a radar system to:
receive, via a radar sensor, a raw radar point cloud comprising a plurality of data points;
define at least one object class comprising a predefined object type and a geometrical shape to enclose an object of the predefined object type;
via a first stage of a neural network:
perform, for the plurality of data points, a semantic segmentation regarding the object class and background; and
estimate, for each data point of the plurality of data points, a first approximation for a spatial condition of the geometrical shape; and
via a second stage of the neural network:
select, based on the first approximation for the spatial condition of the geometrical shape, a subset of the plurality of data points based on the semantic segmentation; and
estimate, for each data point of the subset of the plurality of data points, a second approximation that refines the first approximation for the spatial condition of the geometrical shape and a confidence score for the second approximation for the spatial condition of the geometrical shape;
wherein:
the spatial condition of the geometrical shape comprises a center of the geometrical shape;
estimating the second approximation for the spatial condition of the geometrical shape comprises estimating, for each data point of the subset of the plurality of data points, a respective shifting vector that shifts the respective data point of the subset of the plurality of data points toward the center of the geometrical shape for providing center proposals for the geometrical shape; and
the instructions further cause the one or more processors of the radar system to determine a final estimation for the center of the geometrical shape by calculating an average over the center proposals of the geometrical shape.

* * * * *

UNITED STATES PATENT AND TRADEMARK OFFICE
CERTIFICATE OF CORRECTION

| | | |
|---|---|---|
| PATENT NO. | : 12,055,658 B2 | Page 1 of 1 |
| APPLICATION NO. | : 17/479290 | |
| DATED | : August 6, 2024 | |
| INVENTOR(S) | : Allessandro Cennamo et al. | |

It is certified that error appears in the above-identified patent and that said Letters Patent is hereby corrected as shown below:

In the Claims

Column 13, Claim 1, Line 9: before "first", delete "rough"

Signed and Sealed this
Eighth Day of April, 2025

Coke Morgan Stewart
*Acting Director of the United States Patent and Trademark Office*